United States Patent
Sleator (10) Patent No.: US 9,332,492 B2
(45) Date of Patent: May 3, 2016

(54) RAPID ACKNOWLEDGEMENT OF RADIO TRANSMISSIONS FOR ENERGY MINIMIZATION

(71) Applicant: Google Inc., Mountain View, CA (US)

(72) Inventor: Michael Sleator, Woodside, CA (US)

(73) Assignee: Google Inc., Mountain View, CA (US)

( * ) Notice: Subject to any disclaimer, the term of this patent is extended or adjusted under 35 U.S.C. 154(b) by 58 days.

(21) Appl. No.: 13/722,455

(22) Filed: Dec. 20, 2012

(65) Prior Publication Data

US 2014/0177684 A1 Jun. 26, 2014

(51) Int. Cl.
*H04B 1/38* (2015.01)
*H04L 5/16* (2006.01)
*H04W 52/02* (2009.01)
*H04W 84/18* (2009.01)

(52) U.S. Cl.
CPC .......... *H04W 52/02* (2013.01); *H04W 52/0206* (2013.01); *H04W 52/0229* (2013.01); *H04W 84/18* (2013.01); *Y02B 60/50* (2013.01)

(58) Field of Classification Search
CPC . H04W 84/18; H04W 28/04; H04W 52/0216; H04W 72/04; Y02B 60/50
USPC ................... 375/219, 268, 320; 370/329, 311
See application file for complete search history.

(56) References Cited

U.S. PATENT DOCUMENTS

| | | | | |
|---|---|---|---|---|
| 4,619,002 | A * | 10/1986 | Thro | 455/226.2 |
| 6,990,098 | B1 * | 1/2006 | Eberle | H04L 1/1614 370/312 |
| 7,277,417 | B2 * | 10/2007 | Palm | H04W 74/02 370/311 |
| 7,542,437 | B1 | 6/2009 | Redi et al. | |
| 7,738,455 | B2 * | 6/2010 | Keshavarzian | H04L 1/08 370/216 |
| 2005/0220131 | A1 * | 10/2005 | Ginzburg et al. | 370/432 |
| 2005/0249162 | A1 * | 11/2005 | Kim | H04B 7/0491 370/333 |
| 2006/0007887 | A1 * | 1/2006 | Kwon et al. | 370/329 |
| 2008/0075029 | A1 | 3/2008 | Song | |

(Continued)

FOREIGN PATENT DOCUMENTS

WO WO2009146736 12/2009

OTHER PUBLICATIONS

ISR and Written Opinion dated Mar. 10, 2014, for PCT/US2013/074914.

(Continued)

*Primary Examiner* — Shuwang Liu
*Assistant Examiner* — Sung Ahn
(74) *Attorney, Agent, or Firm* — Morris & Kamlay LLP (57) ABSTRACT

The disclosure relates to a transmission scheme for nodes in a network. More specifically, the disclosure relates to an acknowledgment scheme that minimizes energy requirements for an acknowledgment of a transmission between nodes. The disclosure describes that an energy constrained node may transmit to other nodes in a network and may only require that an acknowledgment of that transmission is received from at least one of the proximal recipients, which may or may not be the ultimate target. In order to minimize the complexity of the receiver in a node and its energy requirements, the acknowledgment scheme may employ simple on-off keying (OOK) irrespective of the modulation technique of the sending transmission. The acknowledgment comprises a series of OOK pulses sent at a specified time after receipt of the transmission. In addition, simultaneously received acknowledgments can be processed and verified without confusion.

27 Claims, 4 Drawing Sheets

(56) References Cited

U.S. PATENT DOCUMENTS

| | | | |
|---|---|---|---|
| 2008/0194283 A1 | 8/2008 | Chaponniere | |
| 2008/0205348 A1* | 8/2008 | Malladi | 370/335 |
| 2009/0092073 A1* | 4/2009 | Doppler et al. | 370/315 |
| 2010/0097969 A1* | 4/2010 | De Kimpe et al. | 370/311 |
| 2010/0183027 A1* | 7/2010 | Mueller | 370/468 |
| 2010/0290379 A1 | 11/2010 | Bahk et al. | |
| 2012/0069793 A1* | 3/2012 | Chung et al. | 370/315 |
| 2012/0195279 A1* | 8/2012 | Sutivong et al. | 370/329 |
| 2012/0281675 A1* | 11/2012 | Liang et al. | 370/331 |

OTHER PUBLICATIONS

Dutta, Prabal et al.,"Wireless ACK Collisions Not Considered Harmful", HotNets-VII—Calgary, Alberta, Canada—Oct. 6-7, 2008, fa.

Pletcher, Nathan M. et al.,"A 52 µW Wake-Up Receiver with -72 dBm Sensitivity Using an Uncertain-IF Architecture", IEEE Journal of Solid-State Circuits, vol. 44, No. 1, pp. 269-280, Jan. 2009, fa.

* cited by examiner

RAPID ACKNOWLEDGEMENT OF RADIO TRANSMISSIONS FOR ENERGY MINIMIZATION

BACKGROUND

Nodes in a wireless network such as a sensor network or a control network often have energy constraints. These nodes may harvest energy from their environment or require a long service life from a battery. Nodes that communicate using radio transmissions often include transceivers for transmitting and receiving data. When communicating using radio transmissions, nodes may use a variety of modulation and coding schemes, with more complex schemes generally offering advantages of improved robustness and throughput. More complex modulation schemes generally require more power for a node to demodulate and decode transmissions. In addition, nodes often work cooperatively to transmit data across a network and may be required to retransmit data that does not reach a target node. Accordingly, nodes must often remain powered-on in order to verify that a transmission has reached its target. Most transceivers operating in an idle state, however, have a power consumption almost equal to the power consumed in a receive state. Accordingly, when determining a communication technique for energy constrained nodes in a network, employing techniques to increase robustness often lead to a decrease in energy efficiency.

BRIEF SUMMARY

In an implementation of the disclosed subject matter, a transmission between nodes in a network may be acknowledged with an acknowledgment transmission employing an amplitude modulation of a radio frequency. When sending a transmission to a plurality of receiving nodes, a sending node may receive an acknowledgment from each of the plurality of receiving nodes within a response time after sending the transmission. The acknowledgments may be additive and the response time may be based on a timing tolerance. The sending node may determine a modulation sequence of a resulting received acknowledgment and validate the received acknowledgment based on the determined modulation sequence. When the acknowledgment is validated, the sending mode may enter into an energy conservation mode.

In an implementation of the disclosed subject matter, a transmission between nodes in a network may be acknowledged with an acknowledgment transmission employing an amplitude modulation of a radio frequency. A sending node may receive a plurality of acknowledgments, which may be additive. The sending node may determine a modulation sequence of a resulting received acknowledgment at a sampling start time. The sampling start time of the modulation may be within a first modulation of each of the plurality of acknowledgments. The node may validate the received acknowledgment based on the determined modulation sequence.

In an implementation of the disclosed subject matter, described is a node in a network. The node may receive an acknowledgment in response to a transmission. The acknowledgment may employ an amplitude modulation of a radio frequency, which may employ on on-off keying (OOK) modulation. The node may send a transmission to a plurality of receiving nodes and the node may receive an acknowledgment from each of the plurality of receiving nodes within a response time after sending the transmission. The acknowledgments may be additive and the response time may be based on a timing tolerance. The sending node may determine a modulation sequence of a resulting received acknowledgment and validate the received acknowledgment based on the determined modulation sequence.

In an implementation of the disclosed subject matter, described is a node in a network. The node may receive a plurality of acknowledgments substantially simultaneously and an energy detector may detect a resulting received acknowledgment signal. The acknowledgment may employ an amplitude modulation of a radio frequency, which may employ on on-off keying (OOK) modulation. The node may include a controller for determining a modulation sequence of the received acknowledgment signal and the controller may validate the received acknowledgment based on the determined modulation sequence.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Described is a more efficient technique for communicating amongst power constrained nodes in a network. In particular, described is an acknowledgment scheme that may reduce or minimize energy requirements for acknowledging successful receipt of a transmission between nodes. The scheme minimizes energy consumption by rapidly acknowledging successful receipt of the transmission and allowing multiple nodes to acknowledge concurrently. For example, if several nodes concurrently send an acknowledgment, the modulations of the acknowledgments may cause interference. The scheme provides the ability to accurately demodulate the interfering acknowledgments as if it were receiving a single acknowledgment transmission. The scheme may use an efficient modulation technique to reduce the amount of power consumption required to process and validate the acknowledgments. Accordingly, receipt of the acknowledgment may require only a rudimentary receiver in a node.

In order to minimize the complexity of the receiver in a node, implementations may employ an amplitude modulation (AM) technique, such as simple on-off keying (OOK) modulation of a radio frequency for acknowledgments. Acknowledgment transmissions may employ OOK modulation irrespective of the modulation technique of the main or sending transmission. OOK is a simple form of amplitude-shift keying (ASK) modulation that represents digital data as the presence or absence of a signal. In its simplest form, the presence of a signal for a specific duration represents a binary one, while its absence for a specific duration represents a binary zero. The scheme may define a particular modulation of on/off pulses for an acknowledgment. If the OOK modulation of the received acknowledgment transmission matches the predefined modulation, the acknowledgment is validated.

In order to further reduce energy requirements, implementations describe entering a node into a power conservation mode based on link-based acknowledgment, rather than end-to-end acknowledgment. For example, an energy constrained node may send a transmission to other nodes in a network and may only require that an acknowledgment of that transmission is received from at least one of the proximal recipient nodes, which may or may not be the ultimate target. If the transmission was addressed to multiple or all nodes, it may not be necessary to identify the nodes or know the number of nodes that successfully received the transmission. Instead, the sending node may only be concerned with knowing that at least one node successfully received the transmission.

Accordingly, the acknowledgment scheme described herein reduces or minimizes energy requirements for acknowledging successful receipt of a transmission.

Figure 1:
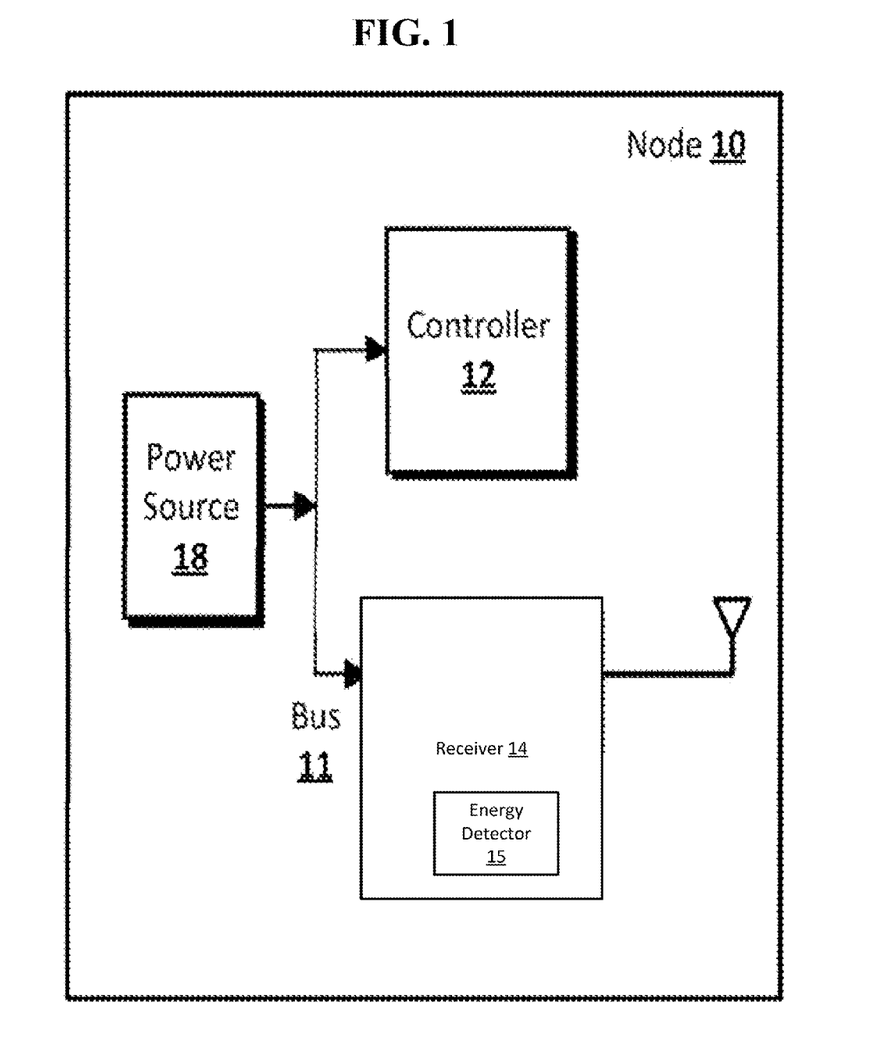
FIG. 1 shows a network node according to an implementation of the disclosed subject matter.

FIG. 1 shows a network node according to an implementation of the disclosed subject matter. The node 10 may include a bus 11 for interconnecting components of the node 10. The node 10 may include a controller 12, a receiver 14, a power source 18, and other components not shown. For example, the node 10 may include sensor components combined with or separate from the components described above. The sensors may monitor, for example, environmental conditions and relay this information through a network of nodes.

The controller 12 may process data and control the functionality of other components in the node 10. The controller 12 may be a microcontroller, a general purpose desktop microprocessor, digital signal processors, FPGAs, ASICs, and the like. Typically, the controller 12 may be a microcontroller due to its low power consumption, but a more complex processor may be used. The controller 12 may perform functions such as initiating transmissions and analyzing acknowledgments including operations such as pattern recognition, validation, or other computations. The controller 12 may also perform other functions of the node 10 including adjusting or setting a power mode based on predefined criteria or states. The controller 12 may also handle network functions such as routing network transmissions received by the receiver 14. For example, the controller 12 may distribute network traffic by determining the appropriate nodes that should receive particular transmissions.

The receiver 14 may be coupled to the controller 12 through the bus 11. The receiver 14 may be part of a transceiver that includes transmitting and receiving functionality, or may be a separate component from a transceiver. The receiver 14 may be a specialized component for receiving acknowledgment transmissions. The receiver 14 may implement suitable amplification and band limiting and may include a simple energy detector 15, a timing circuit, and a finite state machine. The finite state machine may be a built-in state machine that includes logic circuitry for performing certain operations automatically. The energy detector 15 may convert radio frequency pulses into baseband logic pulses and the timing circuit may clock the finite state machine, which progresses through a series of states dependent on the sequence of incoming pulses. One sequence of states may correspond to a valid acknowledgment sequence, which terminates in a valid acknowledgment state. All other sequences may terminate in an invalid acknowledgment state. When the finite state machine signals its arrival at a terminal state, the node controller 12 may take appropriate action. For example, the node 10 may retransmit the original packet in the case of an invalid acknowledgment, or enter into a sleep mode upon a determination of a valid acknowledgment. The node 10 may have particular modes of operation that may correspond to states of the receiver 14. For example, the receiver 14 may have different operational states such as receive, idle, and sleep, as well as a transmit state as it may be part of a transceiver.

The power source 18 provides power to the components of the node 10 and may be connected to the bus 11. In many applications, it may be necessary to control and limit the amount of power being used by the node 10. For example, the power source 18 may include a battery or it may harvest energy from its environment (e.g. solar power), and therefore, the node 10 may have particular energy constraints. The power source 18 may provide a varying degree of power depending on the application. The power source 18 may also vary the power distributed to components of the node 10 based on a particular power mode. For example, a power mode may include an energy conservation mode where components of the node 10 may be powered down, or entered into a sleep state. For example, when a node 10 switches to an energy conservation mode, the receiver 14 may enter into a sleep state.

FIG. 1 is an example configuration. This configuration is not exhaustive of all the components used or their arrangements within this device and is intended to be a non-limiting example. There may be additional or fewer components and these may interact in various ways known to a person of ordinary skill in the art.

Figure 2A:
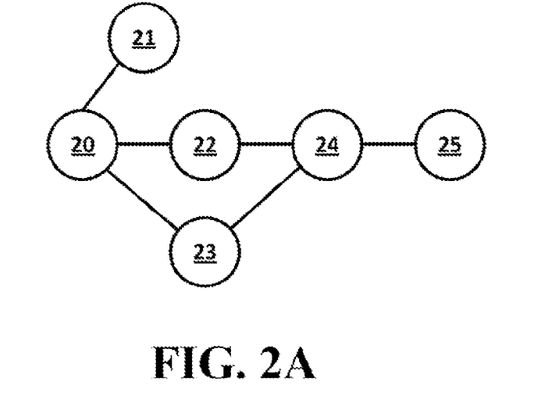
FIG. 2A shows an example network of nodes according to an implementation of the disclosed subject matter.

FIG. 2A shows an example network of nodes according to an implementation of the disclosed subject matter. The example network includes nodes 20-25. Nodes 20-25 may each act at as a connection point in the network, for example, as a redistribution point or a communication endpoint. In a physical sense, each node may be a node 10 as described herein and capable of sending, receiving, or forwarding information over a communications channel (e.g. wireless network). The network topology of the network may vary depending on the application, environment, and other factors as would be known to a person of ordinary skill in the art.

A node may have proximate nodes for sending transmissions through the network. The proximate nodes may be defined by distance from the node or by other means such as a communication path. A proximate node may be a node with which a given node may be in communication; these nodes may then work cooperatively to forward information to subsequent nodes and ultimately, if indicated, to one or more target nodes. In the example network of nodes shown in FIG. 2A, node 20, which originates a transmission, may have proximate nodes 21, 22, and 23. Nodes 24 and 25 may be considered subsequent nodes in relation to node 20. Node 24 would be considered a proximate node to nodes 22, 23, and 25, whereas node 25 would be proximate to node 24 and so on. The topology shown is merely an example and varying configurations may be used. For example, proximate nodes may be proximate to each other and so on.

Figure 2B:
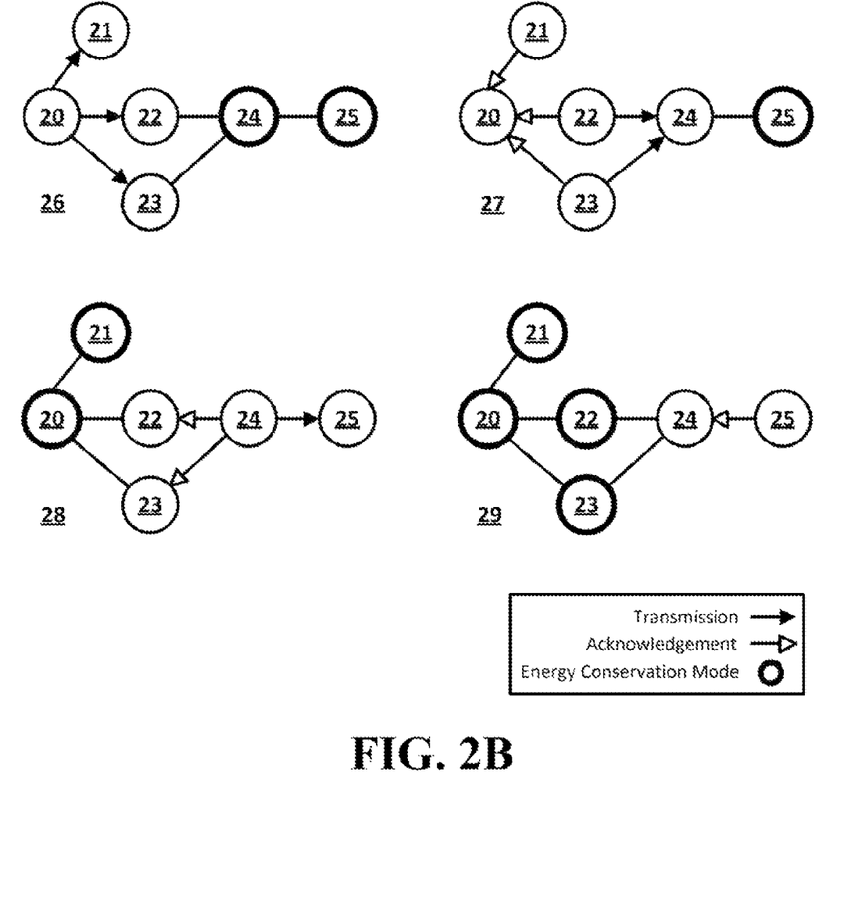
FIG. 2B shows an example of transmissions and acknowledgments between nodes of the network shown in FIG. 2A according to an implementation of the disclosed subject matter.

FIG. 2B shows an example of transmissions and acknowledgments sent between nodes of the network shown in FIG. 2A according to an implementation of the disclosed subject matter. More specifically, steps 26-29 in FIG. 2B show an example of a flow of transmissions between an originating node and a target node. In 26, if node 20, for example, originates a transmission, which has an ultimate target of node 25, node 20 may send a transmission to proximate nodes 21, 22, and 23 as shown. In 27, nodes 21, 22, and 23 upon receiving the transmission may each send an acknowledgment to node 20. Each of the acknowledgments indicates a successful receipt of the transmission. The proximate nodes 21, 22, and 23 may then forward the transmission to their respective proximate nodes (or subsequent nodes in relation to node 20). In this case, nodes 22 and 23 each have node 24 as a proximate node, and accordingly, each forward the transmission to node 24 as shown. Node 24 may awake from an energy conservation mode to receive the transmission (e.g. receiver 14 may operate in a receive state). As shown in 27, node 20 may receive multiple acknowledgments. Upon receiving one or more acknowledgments, node 20 may validate the received acknowledgments, thus verifying that at least one proximate node has successfully received the transmission. Accordingly, upon validation, node 20 may enter into an energy conservation mode (e.g. sleep mode) as shown in 28. Notably, node 20 does not wait for an acknowledgement directly from the intended recipient node 25.

In 28, node 20 has validated the acknowledgment and may enter into an energy conservation mode. As shown, node 21 did not forward the transmission to any proximate nodes. Accordingly, it is not necessary for node 21 to wait for an acknowledgment and may enter into an energy conservation mode. In a similar manner as described above, node 24 may send an acknowledgment to each of nodes 22 and 23 upon successful receipt of the transmission. Node 24 may also forward the transmission to node 25, which in turn acknowledges receipt by sending an acknowledgment to node 24 as shown in 29. In 29, the transmission has reached the target node 25 and the transmission need not be forwarded. Node 20 which originated the transmission, however, may have since entered into an energy conservation mode. Accordingly, node 20 is not necessarily directly aware that target node 25 received the transmission. Rather, node 20 may operate as if node 25 will necessarily have received the transmission based only upon the acknowledgements received from proximate nodes 21, 22, 23. In this example, power consumption may be reduced or minimized because the acknowledgment scheme is concerned with link-based acknowledgment (e.g. node 20 to at least one of 21, 22, and 23) and not end-to-end acknowledgment (e.g. node 20 to node 25). This reduces or minimizes the time that a receiver 14 in node 20 must remain in a receive or an idle state. This is beneficial because many transceivers operating in an idle state have a power consumption almost equal to the power consumption in a receive state. Thus, it is more energy efficient for the receiver 14 to enter into a sleep state rather than remain in an idle state when it is not transmitting or receiving.

In addition, a significant amount of power is consumed when switching from a sleep state to a transmit state. Accordingly, the scheme reduces or minimizes the need for an originating node to wake-up from a sleep mode to a mode for retransmitting if the target does not successfully receive the transmission. For example, the originating node may rely on subsequent nodes for retransmission, and does not itself need to send a retransmission if at least one subsequent node successfully acknowledges the originating transmission.

Figure 3:
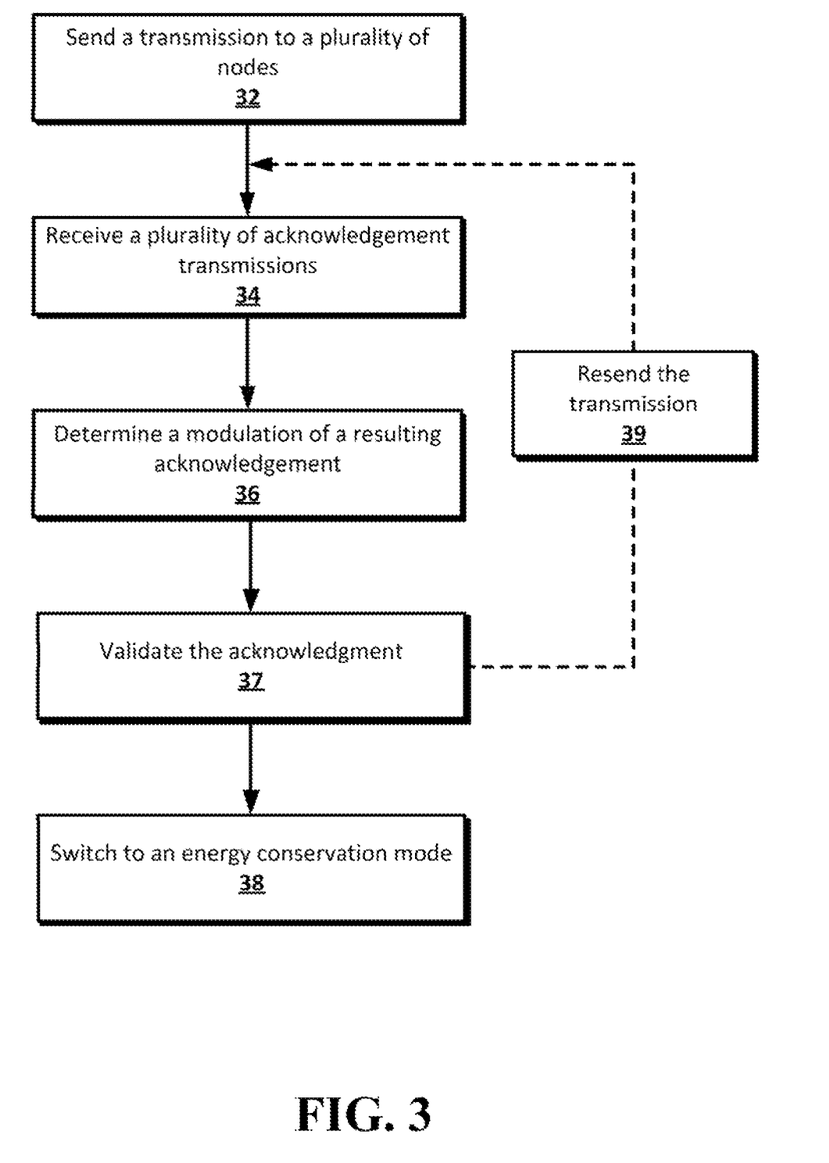
FIG. 3 shows a process flow according to an implementation of the disclosed subject matter.

FIG. 3 shows a process flow according to an implementation of the disclosed subject matter. In step 32, a node may send a transmission to a plurality of other nodes in the network. Typically, the transmission includes a wireless communication over a radio frequency, but may employ other forms of transmission over a transmission medium. The radio frequency may be within various frequency bands and may employ various forms of modulation including amplitude-shift keying (ASK) and on-off keying (OOK) as described earlier, plus other modulations techniques such as frequency-shift keying (FSK), phase-shift keying (PSK), and the like. The modulation and/or coding scheme for sending a transmission may depend on the application as more complex schemes generally offer advantages of improved robustness and throughput. More complex modulation schemes may, however, require more power for a node to demodulate and decode transmissions.

The nodes may cooperatively send and forward transmissions to a target node. There may be multiple target nodes, for example, if the transmission is a broadcast or a multicast. When sending a transmission to one or more target nodes, a node may first send the transmission to proximate nodes, which in turn forward the transmission to their proximate nodes and so on until each of the one or more target nodes receives the transmission. For example, a node may send a transmission to all of its proximate nodes, which in turn send the transmission to all of its proximate nodes and so on.

In step 34, a node that sends a transmission may receive one or more acknowledgments from one or more proximate nodes that successfully received the transmission. The acknowledgment informs the sending node that the transmission was successfully received by the receiving node. All of the nodes that successfully receive the transmission may send an acknowledgment. Accordingly, the sending node may receive multiple acknowledgments. The acknowledgment scheme may also specify that not all nodes are required to send an acknowledgment as particular nodes may be aware of other nodes acknowledging the transmission. For example, a receiving node may have already received the transmission, which it has already forwarded, or the receiving node may be aware of the other proximate nodes of the sender and therefore may be able to reduce or eliminate redundant acknowledgments.

Typically, the acknowledgment scheme employs an OOK modulation of a radio frequency to minimize energy consumption, but other modulations may be employed. In addition, the acknowledgment scheme may employ other forms of transmission over a transmission medium. Although OOK may be more susceptible to interference compared to other forms of modulation (e.g. FSK), the predefined OOK modulation may employ characteristics that make it less susceptible to a false validation from interference. For example, the OOK modulation may employ an optimized pattern of specific and irregularly-timed pulses. When energy from other sources interferes with the acknowledgment, the energy may be additive. This interference has a low probability of matching the predefined modulation. Accordingly, interference may cause an acknowledgment to fail, but the probability of a false validation is relatively low. This is desirable because a failed acknowledgment results in retransmission and no loss of data, whereas a false validation often results in a loss of data.

In the acknowledgment scheme according to an implementation of the disclosed subject matter, the acknowledgment may or may not use the same modulation technique as the transmission. For example, the transmission and acknowledgment may both use a modulation of a radio frequency, but the acknowledgment may use an OOK modulation irrespective of the modulation used for the transmission, which may employ a more complex modulation such as FSK. An acknowledgment scheme employing OOK modulation for acknowledgments may provide energy consumption benefits that may not be available using other encoding techniques as described below.

The acknowledgment scheme may define response timings for acknowledging a successful transmission. The acknowledgment may be sent on, for example, an AM radio frequency as described above. A receiving node may send an acknowledgment immediately after receiving the transmission or within a response time after the transmission. The response time may be a specific time or a time range or window and may be based on a timing tolerance of the acknowledgment scheme. By utilizing a response time for acknowledgments, a node may receive acknowledgments concurrently. Concurrent acknowledgments are acknowledgments that are received simultaneously and/or within the timing tolerance. These concurrent acknowledgments may collide or interfere with each other and, due to the nature of radio frequencies, the modulations of these interfering acknowledgments may be additive. By specifying the response time, the resulting acknowledgment from concurrent acknowledgments may be interpreted by a node as a single acknowledgment transmission. Allowing a node to process additive acknowledgments as a single acknowledgment minimizes the complexity of the validation process, and thus, reduces energy consumption.

The timing tolerance of the acknowledgment scheme may define a margin within which a node may process multiple acknowledgments as a single transmission. For example, a timing tolerance of 50 nanoseconds allows a node to validate acknowledgments received within 50 nanoseconds of each other as a single transmission. Typically, the timing tolerance is based on a bit time of the acknowledgment scheme, but the scheme may use other techniques or calculations for determining the timing tolerance. The bit time relates to the duration of time required to read one value (e.g. 1 or 0) of the modulation. For example, a bit time for OOK would be the time required to read one on or off pulse of the modulation. The acknowledgment scheme may be measured as bits per second. For example, the bit time for a 10 Mbit/s scheme equals 100 nanoseconds. Accordingly, a 10 Mbit/s scheme with a timing tolerance of a ½ bit time would have a timing tolerance of 50 nanoseconds.

The acknowledgment scheme may not necessarily define an explicit response time or timing tolerance. These may be implicit and based on the capabilities of the nodes and network. The acknowledgment scheme may be configured to allow a node to immediately respond with an acknowledgment. For example, a bit time of the acknowledgment scheme may be specified according to the necessary response time of immediate acknowledgments. As a result, immediate acknowledgments may be processed as a single acknowledgment and an acknowledging node need not wait or be concerned with explicit timings when sending the acknowledgment. All that is necessary in this example is that the response is immediate. This may provide an energy benefit by allowing rapid acknowledgment without a required delay that may be necessary in schemes where identification of acknowledgments is necessary or schemes where interfering acknowledgments may not be accurately validated.

In step 36, the sending node may determine a modulation of a resulting received acknowledgment. Determining a modulation involves sampling the received acknowledgment signal and determining a modulation sequence. For example, if OOK is employed, the predefined modulation sequence may be based on a pattern of specific and irregularly-timed pulses. As described, the acknowledgment scheme may specify an acknowledgment response time so that multiple acknowledgments are within a timing tolerance. Accordingly, a sending node may receive concurrent acknowledgments and due to the additive nature of interfering acknowledgments, a node may analyze the resulting acknowledgment as a single transmission.

The sampling process may account for the timing tolerance in order to process concurrent acknowledgments as if it were a single transmission. For example, acknowledgments may arrive at the sending node at different times due to interrupt handling latencies, component variations, propagation times, etc. Accordingly, received acknowledgments may be offset. The acknowledgment scheme may accommodate for these differences without affecting the validation process. For example, when determining on/off values of a modulation, a node may sample the signal at a time corresponding to a nominal center bit time to accommodate for any offsets. A nominal center bit time may relate, for example, to a time when pulses (e.g. "on" pulse of OOK) of interfering acknowledgments are at, or near, a maximum amplitude. In addition, a sampling time may be based on a timing of the modulations of the acknowledgment. For example, the sampling start time may be within the first modulation of a plurality of concurrent acknowledgments.

In step 37, the sending node may validate the resulting received acknowledgment. The acknowledgment scheme may predefine a valid modulation sequence for acknowledgments. To determine whether the received acknowledgment is valid, the sending node may match the determined modulation sequence with a predefined modulation sequence. Accordingly, the resulting modulation sequence from a plurality of received acknowledgments may match each of the received acknowledgments. As described above, a node validating an acknowledgment may not be concerned with identifying the source of the acknowledgment. The node may only be concerned with determining if the acknowledgment from one or more nodes matches the predefined modulation sequence. By validating the acknowledgment, the node is aware that at least one node successfully received the transmission, which is sufficient in a link-based acknowledgment scheme. Thus, upon validation, the node may immediately enter into an energy conservation mode as described in step 38. This provides an energy consumption benefit by minimizing the time a receiver 14 in a node must remain in a receive or idle state.

In step 39, if an acknowledgment is not received within a response time, or the determined modulation sequence is invalid, a sending node may retransmit the transmission. The sending node may retransmit the transmission to the same or different proximate nodes that previously received the transmission in the same manner as described in step 32. In the unlikely event that an acknowledgment fails due to cancelling modulations, the scheme may address this situation by increasing the complexity of the protocol. For example, the scheme may employ a backoff protocol. For instance, the response time for the acknowledgment transmission may be extended to include multiple time slots. Acknowledging nodes may then randomly select a time slot, or select a time slot based on identity information such as a predefined number of bits of a serial number. The backoff protocol may require more complexity, and accordingly, this overhead may be reduced by initiating the protocol only when the initial acknowledgment fails. As one technique for recognizing a failed acknowledgment, a node may identify a retransmission of the initial transmission. For example, a receiving node may recognize a transmission from a particular sending node as a retransmission, and in response, the receiving node may acknowledge the retransmission according to the backoff protocol.

In step 38, the node may switch to an energy conservation mode once it is determined that a valid acknowledgment is received. For example, the node may enter into a sleep mode, hibernate, power-down, or other mode to conserve energy. To increase energy conservation, the sending node may rapidly enter into a power conservation mode based on link-based acknowledgment. Accordingly, a sending node need not remain in a receive or idle mode to determine that the original transmission reaches the target which may be required in end-to-end acknowledgment schemes. For example, a node sending a transmission may enter into an energy conservation mode immediately upon determining a valid acknowledgment from a receiving node. This may occur prior to the receiving node receiving an acknowledgment from a subsequent node. In fact, a node sending a transmission may enter into an energy conservation mode prior to a receiving node even forwarding the transmission to a subsequent node.

Figure 4:
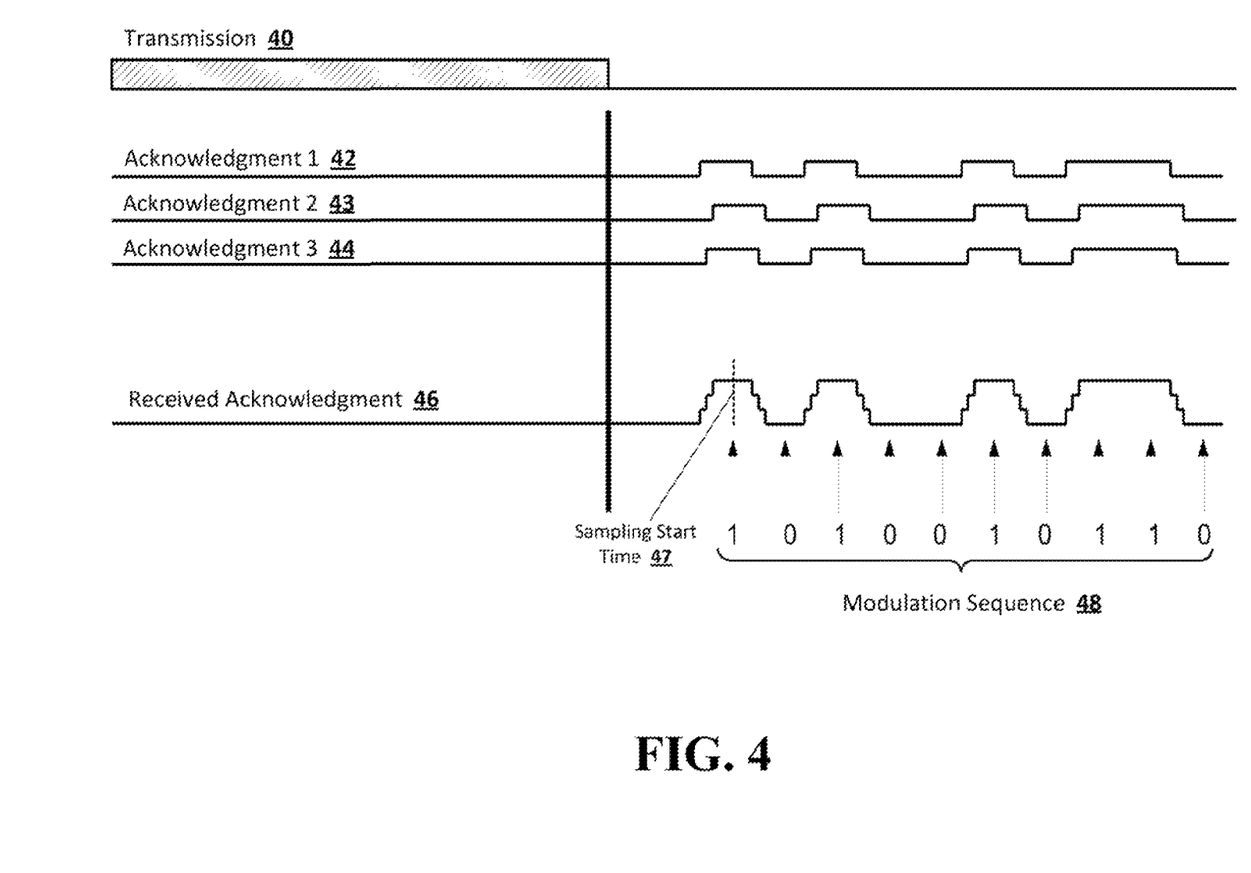
FIG. 4 shows a timing diagram showing the modulation of a resulting received acknowledgment signal from multiple acknowledgments according to an implementation of the disclosed subject matter.

FIG. 4 shows a timing diagram showing the modulation of a resulting received acknowledgment signal from multiple acknowledgment transmissions according to an implementation of the disclosed subject matter. As shown in the example of FIG. 4, a sending node may send a transmission 40, which may be a radio frequency employing a modulation technique as described above. One or more receiving nodes may acknowledge successful receipt of the transmission. In this example, three receiving nodes successfully received the transmission and each respond by sending acknowledgment transmissions 42, 43, and 44 respectively. In this example, acknowledgments 42, 43, and 44 each employ an OOK modulation. As shown, each acknowledgment includes a modulation of a predefined sequence of on/off pulses. In this example, all of the modulations are valid, and accordingly, each modulation employs the same valid sequence. The precise response time of each acknowledgment may be different, and accordingly, the acknowledgments may be offset from each other as shown. In this example, however, the acknowledgments are still within a timing tolerance. As shown in the received acknowledgment 46, the on/off sequence of pulses are additive and the amplitude of the received acknowledgment signal 46 reflects the offsets of each of the acknowledgments. The acknowledgments 42, 43, and 44 are additive and a node may analyze the resulting acknowledgment as a single received acknowledgment 46. When determining the modulation of the received acknowledgment 46, a node may start sampling at a sampling start time 47. The sampling start time 47 may be based on the response time and/or timing tolerance. For example, as shown in FIG. 4, the sampling start time 47 occurs at a nominal center bit time when the amplitude of the first modulation is at its peak. As shown, the remaining values may be determined at each subsequent nominal center bit time. In addition, the sampling start time 47 may also be based on a modulation of an acknowledgment. For example, the sampling start time 47 in FIG. 4 is also within a first modulation of each of the acknowledgments 42, 43, and 44. The acknowledgements shown in the example FIG. 4 employ a modulation sequence of approximately equal amplitude, but differing amplitudes may be employed without affecting the process for determining a modulation sequence as described above.

Once the modulation sequence is determined, it may be validated. As shown in the example of FIG. 4, the determined modulation sequence 48 of the received acknowledgment 46 is "1010010110." To determine whether this sequence is valid, it may be compared to the predefined valid sequence. In this example, the determined modulation sequence 48 matches the predefined valid sequence of "1010010110," and thus, the received acknowledgment 46 is validated. As shown in this example, the modulation sequence of the received acknowledgment 46 matches each of the valid sequences of acknowledgments 42, 43, and 44. Accordingly, the node that received the acknowledgment signal 46 validates the signal in the same manner and determines the same result as if the received acknowledgment 46 was from a single node. In fact, a node receiving the acknowledgment 46 may not have the ability, nor may it be necessary, to distinguish between a single acknowledgment and multiple concurrent or overlapping acknowledgments. This provides an efficient sampling and validation process which reduces the requirements of the receiver 14 thereby reducing energy consumption. In addition, the validation process takes the same amount of time to validate multiple acknowledgments compared to a single acknowledgment. This reduces the time the receiver 14 may need to remain in a receive or idle mode, and accordingly, may provide an additional energy conservation benefit.

As described above, the acknowledgment scheme may employ an AM scheme, such as OOK, in order to validate concurrent acknowledgments in an energy efficient manner. Validating concurrent acknowledgments in this manner may not be possible with other modulation techniques. For example, other modulation techniques may be susceptible to a receiver failing to distinguish between the interference effects of multiple transmissions and the modulation of a single transmission. For instance, when two transmissions with equal strength, but with different frequencies are received, a beat frequency may be generated equal to the difference between the two transmissions. This beat frequency may disrupt or prevent the demodulation process of more complex modulation techniques such as FSK and PSK. In contrast, when OOK or ASK is employed, the beat frequency may be addressed during demodulation. For example, if the beat frequency is higher than the bit time, the beat may be filtered out by the receiver 14. When the beat frequency is lower than the bit time, the scheme may address this situation by optimizing the predefined acknowledgment modulation to minimize the probability that the validation fails from cancelling modulations.

As described herein, the acknowledgment scheme may handle multiple acknowledgments with a processing solution. This provides advantages because processing is relatively efficient compared to powering a node and transmitting. For example, the energy cost of transmitting 1 Kb of data a distance of 100 meters is approximately the same as that used for the execution of 3 million instructions by a 100 million instructions per second/W processor. The processing solution may use a logical construct to determine a valid acknowledgment. With AM, the receiver 14 may receive multiple acknowledgments that are additive resulting in a received single with amplitude increases for interfering pulses. As described above, these multiple acknowledgments may be within a response time, and accordingly, the resulting received acknowledgment may be processed as a single acknowledgement. To demodulate multiple acknowledgments as a single acknowledgment, an OR operation may be used. For example with OOK, the presence of a signal, or a signal above a threshold regardless of the increase in amplitude (i.e. interfering pulses) results in an on state, and an absence of a signal, or a signal below a threshold results in an off state. For example, concurrent "off" pulses still result in an "off" pulse. Accordingly, by employing OOK, energy consumption may be reduced by simplifying the demodulation process.

The modulations used in implementations may be optimized to a particular application. Similarly, the exact timing, number of pulses, and detection threshold for radio frequency modulations may be optimized for a particular implementation, but do not affect the underlying principles described herein. The particular components chosen, for example, a specialized receiver or a general radio transceiver may be based on the energy constraints and requirements of the network.

The flow diagrams described herein are just examples. There may be variations to these diagrams or the steps (or operations) described therein without departing from the implementations described. For instance, the steps may be performed in a differing order, or steps may be added, deleted or modified.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated. References to "one implementation," "an implementation," "an example implementation," and the like, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, such feature, structure, or characteristic may be included in other implementations whether or not explicitly described. The term "substantially" may be used herein in association with a claim limitation and may be interpreted as "as nearly as practicable," "within technical limitations," and the like.

The invention claimed is:

1. A method of acknowledging a transmission between nodes in a network with an acknowledgment employing an amplitude modulation of a radio frequency, comprising:
   sending the transmission from a sending node to a first receiving node and a second receiving node;
   receiving, substantially concurrently at the sending node, a first acknowledgment from the first receiving node and a second acknowledgment from the second receiving node;
   combining an amplitude of a modulation sequence of the first acknowledgment and an amplitude of a modulation sequence of the second acknowledgment into a combined received acknowledgement;
      wherein combining comprises adding the amplitude of the modulation sequence of the first acknowledgement to the amplitude of the modulation sequence of the second acknowledgement;
   determining a modulation sequence of the combined received acknowledgment; and
   validating the combined received acknowledgment based on the determined modulation sequence.

2. The method of claim 1, wherein receiving is within a response time and the response time is a time range based on a timing tolerance.

3. The method of claim 2, wherein the timing tolerance is less than one bit time of the combined received acknowledgment.

4. The method of claim 1, wherein the first acknowledgment is sent immediately upon the first receiving node receiving the transmission and the second acknowledgment is sent immediately upon the second receiving node receiving the transmission.

5. The method of claim 1, further comprising entering the sending node into an energy conservation mode upon validating the combined received acknowledgment as a valid acknowledgment.

6. The method of claim 5, further comprising forwarding the transmission from the first receiving node to a subsequent node, and wherein said entering the sending node into the energy conservation mode occurs prior to the first node receiving an acknowledgment from the subsequent node.

7. The method of claim 5, further comprising forwarding the transmission from the first receiving node to a subsequent node, and wherein said entering the sending node into the energy conservation mode occurs prior to the first receiving node forwarding the transmission to a subsequent node.

8. The method of claim 1, wherein the determined modulation sequence of the combined received acknowledgment matches the modulation sequence of each of the first acknowledgment and the second acknowledgment.

9. The method of claim 1, wherein said determining the modulation sequence comprises determining a modulation value at a nominal center bit time of the combined received acknowledgment.

10. The method of claim 1, wherein in said determining the modulation sequence of the combined received acknowledgment is indistinguishable from determining a modulation sequence of one of the first acknowledgment and the second acknowledgment.

11. The method of claim 1, wherein the amplitude modulation of the acknowledgment employs an on-off keying (OOK) modulation.

12. The method of claim 1, wherein said validating comprises matching the determined modulation sequence with a predefined modulation sequence.

13. The method of claim 1, wherein the modulation employed for the transmission includes one of a frequency-shift keying (FSK) and phase-shift keying (PSK), and the modulation employed for the combined received acknowledgment includes amplitude-shift keying (ASK).

14. A method of acknowledging a transmission between nodes in a network with an acknowledgment employing an amplitude modulation of a radio frequency, comprising:
   sending the transmission from a sending node to a first receiving node and a second receiving node;
   receiving, substantially concurrently at the sending node, a first acknowledgment from the first receiving node and a second acknowledgment from the second receiving node;
   combining an amplitude of a modulation sequence of the first acknowledgment and an amplitude of a modulation sequence of the second acknowledgment into a combined received acknowledgement;
      wherein combining comprises adding the amplitude of the modulation sequence of the first acknowledgement to the amplitude of the modulation sequence of the second acknowledgement;
   determining a modulation sequence of the combined received acknowledgment, said determining the modulation sequence starting at a sampling start time within a first modulation of each of the received first acknowledgment and the received second acknowledgment; and
   validating the combined received acknowledgment based on the determined modulation sequence.

15. The method of claim 14, wherein the first acknowledgment is sent immediately upon the first receiving node receiving the transmission and the second acknowledgment is sent immediately upon the second receiving node receiving the transmission.

16. The method of claim 14, further comprising entering the sending node into an energy conservation mode upon validating the combined received acknowledgment as a valid acknowledgment and forwarding the transmission from the first receiving node to a subsequent node, and wherein said entering the sending node into the energy conservation mode occurs prior to the first receiving node forwarding the transmission to a subsequent node.

17. The method of claim 14, wherein the amplitude modulation of the acknowledgment employs an on-off keying (OOK) modulation.

18. A node among a plurality of nodes in a network, each node acknowledging receipt of a transmission with an acknowledgment employing an amplitude modulation of a radio frequency, comprising:
   a transceiver sending a transmission to a first receiving node and a second receiving node and receiving, substantially concurrently, a first acknowledgment from the first receiving node and a second acknowledgment from the second receiving node; and
   a controller combining an amplitude of a modulation sequence of the first acknowledgment and an amplitude of a modulation sequence of the second acknowledgment into a combined received acknowledgement, determining a modulation sequence of the combined received acknowledgment, and validating the combined received acknowledgment based on the determined modulation sequence;
   wherein combining comprises adding the amplitude of the modulation sequence of the first acknowledgement to the amplitude of the modulation sequence of the second acknowledgement.

19. The node of claim 18, wherein receiving is within a response time, and the response time is a time range based on a timing tolerance.

20. The node of claim 19, wherein the timing tolerance is less than one bit time of the combined received acknowledgment.

21. The node of claim 18, wherein the first acknowledgment is sent immediately upon the first receiving node receiving the transmission and the second acknowledgment is sent immediately upon the second receiving node receiving the transmission.

22. The node of claim 18, wherein the amplitude modulation of the combined received acknowledgment employs an on-off keying (OOK) modulation.

23. A node in a network receiving an acknowledgment in response to a transmission, the acknowledgment employing an amplitude modulation of a radio frequency, comprising:
   an energy detector receiving, substantially simultaneously, a first acknowledgment from a first receiving node and a second acknowledgment from a second receiving node, combining an amplitude of a modulation sequence of the first acknowledgment and an amplitude of a modulation sequence of the second acknowledgment into a combined received acknowledgement signal;
   wherein combining comprises adding the amplitude of the modulation sequence of the first acknowledgement to the amplitude of the modulation sequence of the second acknowledgement; and
   a controller determining a modulation sequence of the combined received acknowledgment signal and validating the combined received acknowledgment signal based on the determined modulation sequence.

24. The node of claim 23, wherein the first acknowledgment is sent immediately upon the first receiving node receiving the transmission and the second acknowledgment is sent immediately upon the second receiving node receiving the transmission.

25. The node of claim 23, wherein the amplitude modulation of the combined received acknowledgment signal employs an on-off keying (OOK) modulation.

26. The node of claim 23, wherein determining the modulation sequence of the combined received acknowledgment signal is indistinguishable from determining a modulation sequence of one of the first acknowledgment and the second acknowledgment by said controller.

27. The method of claim 1, wherein validating comprises matching the determined modulation sequence with a predefined modulation sequence, and wherein an amplitude of the determined modulation sequence is greater than the amplitude of the modulation sequence of the first acknowledgement.

* * * * *